(12) United States Patent
Wilhelm

(10) Patent No.: US 6,252,310 B1
(45) Date of Patent: *Jun. 26, 2001

(54) BALANCED MODULAR POWER MANAGEMENT SYSTEM AND METHOD

(75) Inventor: William George Wilhelm, Riverhead, NY (US)

(73) Assignee: Nextek Power Systems, Inc., Ronkonkoma, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/363,090

(22) Filed: Jul. 28, 1999

(51) Int. Cl.⁷ .................................................. H02J 1/00
(52) U.S. Cl. ............................ 307/11; 307/72; 307/75; 307/64; 361/648; 361/622
(58) Field of Search ................................ 307/72, 73, 75, 307/64; 361/648, 622

(56) References Cited

U.S. PATENT DOCUMENTS

| | | | |
|---|---|---|---|
| 2,194,822 * | 3/1940 | Dannheiser | 171/97 |
| 4,206,608 * | 6/1980 | Bell | 60/698 |
| 4,315,163 * | 2/1982 | Bienville | 307/66 |
| 4,349,863 * | 9/1982 | Peterson | 362/20 |
| 4,426,587 * | 1/1984 | Nouet | 307/66 |
| 4,464,724 * | 8/1984 | Gurr et al. | 364/492 |
| 4,508,996 * | 4/1985 | Clegg et al. | 315/224 |
| 4,551,980 * | 11/1985 | Bronicki | 60/698 |
| 4,630,005 * | 12/1986 | Clegg et al. | 331/113 |
| 4,663,723 * | 5/1987 | Umeda | 364/492 |
| 4,682,078 * | 7/1987 | Pascalide | 315/86 |
| 4,731,547 * | 3/1988 | Alenduff et al. | 307/85 |
| 4,742,291 * | 5/1988 | Bobier et al. | 320/39 |
| 4,821,166 * | 4/1989 | Albach | 363/89 |
| 4,860,185 * | 8/1989 | Brewer et al. | 363/41 |
| 4,894,764 * | 1/1990 | Meyer et al. | 363/65 |
| 5,053,635 * | 10/1991 | West | 307/57 |
| 5,089,937 * | 2/1992 | Carrubba et al. | 361/732 |
| 5,289,045 * | 2/1994 | Lavin et al. | 307/64 |
| 5,500,561 * | 3/1996 | Wilhelm | 307/64 |
| 5,532,525 * | 7/1996 | Kaiser et al. | 307/64 |
| 5,786,642 * | 7/1998 | Wilhelm | 307/72 |

* cited by examiner

Primary Examiner—Josie Ballato
Assistant Examiner—R. Rios Cuevas
(74) Attorney, Agent, or Firm—Alfred M. Walker (57) ABSTRACT

An electrical distribution system and method has storage battery mechanism of very large equivalent capacitance providing excellent ripple filtering and an ideal path to ground, and filter capacitor mechanism of microfarad size providing DC blocking and limited AC path to ground. The storage battery entity is maintained as to its charge by DC supply, which provides regulated DC power in which switching regulation may be involved. The system and method provides dual voltage capability, both DC and AC, in which circuit breakers may be ganged for simultaneous tripping, and in which intrinsic DC circuit(s) may be looped to increase current-carrying capability. A DC isolation capacitor is connected to a common current path, such as to one of the busses, such as, for example, in series with the neutral circuit, as a means for avoiding undesirable DC current paths as may be encountered due to a multitude of established neutral-line connections to earthing grounds established throughout in AC power supply network. This isolation capacitor is of sufficient capacitance to allow the low loss passage of unbalanced AC if the loads connected to the distribution system produce unequal currents in the common wiring.

48 Claims, 5 Drawing Sheets

BALANCED MODULAR POWER MANAGEMENT SYSTEM AND METHOD

BACKGROUND AND BRIEF SUMMARY OF THE INVENTION

At the outset, the terms "inverter", "converter" and "intrinsic DC load means" shall be defined insofar as usage in this disclosure is concerned. "Inverter" shall mean a device, circuit or system that delivers ac power when energized from a source of dc power i.e., it is the opposite of rectification. "Converter" shall mean a circuit or system that both receives and provides dc power in which ac is generated as an intermediate process in the flow of energy. The term "intrinsic DC load means" shall mean a DC load means which functions only in response to DC power input, i.e., it does not require and should not tolerate the inherent inefficiency and complexity of a converter in order to function properly.

My prior U.S. Pat. No. 5,500,561 is directed to A CUSTOMER SIDE POWER MANAGEMENT SYSTEM AND METHOD and discloses several embodiments wherein substantial relaxation is achieved in the requirement that an electric or public utility maintain a generating capacity far exceeding the anticipated maximum demand for electricity. Generally speaking, my prior patent is directed to systems wherein a direct current power supply means, such as, for example, a DC power source, in the form of storage battery means is included in the power management system and operates to alleviate excessive power demands on the electric utility.

Briefly stated, the problem addressed in my prior applications is, at its heart, based upon the fact that power demands placed upon the electric utilities by consumers fluctuate enormously dependent upon the time of day, the day of the week, the season of the year and/or any other factor which may affect demand, including the type of consumer. So-called uninterruptible power supplies have been proposed but are generally inadequate to alleviate the problem efficiently. Such a system is exemplified by the Lavin et al U.S. Pat. No. 5,289,045 of Feb. 22, 1994 and attention is called to the references cited as prior art against my aforesaid prior applications.

This application relates to electrical distribution generally and in particular to electrical distribution as it applies particularly to dwellings for example, wherein it is well known that electrical energy is distributed from a public or electric utility in AC form, normally in split-phase having the meaning that two 120 V AC phases of the utility are brought into a building so as to be available as two 120 V AC circuits and a 240 V AC circuit. Such a three-wire system involves the use of two line power conductors and a neutral wire conductor supplied by the utility. These conductors, according to usual practice, are brought into the customer's distribution box and connected therein to two line power busses through suitable circuit breaker means, such as, for example, a current responsive circuit interrupter, and directly to a neutral buss housed within the box. The box also houses a ground buss which, according to normal practice, is provided with a wire connection extending externally of the box and into electrical connection with an earthing pole which establishes earth potential at the ground buss.

This application is directed to the problem of efficiently using and/or utilizing electrical power and to the method thereof—more specifically, of efficiently utilizing DC power at the site of interest by establishing a dual voltage capability at such site. Further, this application is directed to the problem where multiple earth grounds are established within an electrical distribution system, causing undesirable DC current paths.

An object of this invention is to permit two different power supply systems, one DC and the other AC, to reside on common building wiring as found in the United States and elsewhere in the world.

Another object of this invention is to provide a compatible power wiring system that allows both DC power operation and AC power operation to coexist, without modification to the power wiring system, from common building wiring power outlets. This compatibility allows, for example, appliances which operate on low voltage 24 V DC, especially those which now do or in the future will function as "intrinsic DC devices", and conventional 120 V AC appliances to be used within the same building space and with existing cabling or wiring.

Another object of this invention is to introduce the concept of ganged circuit breaker means in power wiring systems.

Still another object of this invention is the provision of dual voltage capability with ganged circuit breaker means functioning to interrupt not only both the "high" and "low" sides of AC voltage circuitry but DC circuitry as well.

Stated otherwise, the preceding object may utilize one circuit breaker means in an AC path and a second circuit breaker means in a DC current path as well.

Still another object of this invention is to provide an intrinsic DC load circuit means that embodies looping of the wiring through one circuit breaker means connecting to one side of the DC power source and through a second circuit breaker means to the other side of the DC power source.

A further object of this invention is to provide apparatus that requires only a simple input connection after the electric distribution box of living quarters or of a dwelling (either mobile or not) such that it will function in a variety of different ways which permit stand alone function with DC energy input from a plurality of DC power source means i.e., from a generator means, photo-voltaic means, wind turbine means, etc.

A further object of the invention is to provide the combination of filter capacitor means and storage battery means disposed in electrical parallel, the filter capacitor means functioning as a limited AC path to ground, sized, in capacitance to assure a low impedance path to ground at 60 Hz, the storage battery means functioning to conduct current in opposite directions, consistent with the requirements for AC conduction to ground. That is, the storage battery means and its associated DC power supply provide both a DC isolation path to ground and an AC continuity path to ground whereas the filter capacitor means supplies a limited AC path to ground.

A further object of this invention is to provide a system in conformity with the preceding object wherein the filter capacitor means is hard wired within the electrical distribution box and the storage battery means is housed within the module unit of this invention.

Another object of the invention is to provide the combination of an electrical distribution box housing neutral buss means, power buss means, ground buss means and filter capacitor means, the latter being of limited capacitance and little bulk so as to provide a limited AC path to ground, and a modular power system module unit which houses storage battery means of substantial capacitance and large bulk compared with said filter capacitor means so as to conduct current in opposite directions to provide for AC conduction to ground.

Another object of the invention is to provide a practical approach to the application of building-side DC power for intrinsic DC devices or loads. As noted above, by intrinsic DC devices or loads is meant DC devices which are intended to be operated only on DC. That is, although an intrinsic DC device can operate when supplied with any DC power, it is not intended that an "intrinsic DC device" be operated by converted DC because of the inevitable loss of efficiency when ac is generated as the intermediate process in the flow of energy.

It is a further object of this invention to minimize a customer's peak power demands by using a storage battery means for peak clipping and valley filling purposes.

Another important object of this invention is to provide a modular unit in which the modular unit comprises storage battery means for providing a battery equivalent capacitance which is very large in capacitance and bulk in combination with voltage regulator means (not a converter) for controlling the charge level of the storage battery means.

Another object of this invention is to provide a system in accord with the preceding object in combination with intrinsic DC load means for utilizing the storage capacity of the storage battery means.

Another object of this invention is to provide a modular system using a rechargeable storage battery means as part of a critical conversion circuit for filtering (minimizing the AC ripple inherent with rectified AC) and voltage regulation (in the absence of conversion, i.e., not a converter) to protect the storage battery means from damage by overcharging or undercharging (minimizing the DC voltage variation due to load and line supply variations) and in which the storage battery means supplies power to an intrinsic DC load means.

Still another object of the invention is to provide the combination of an electrical distribution box housing neutral buss means, power buss means, ground buss means and filter capacitor means, the latter being of limited capacitance and little bulk so as to provide a limited AC path to ground and be DC blocking, and a modular power system module unit which houses storage battery means of substantial capacitance and large bulk compared with said filter capacitor means, and intrinsic DC load means for drawing upon the storage capacity of said storage battery means.

A further object of this invention involves the battery equivalent capacitance of said storage battery means being very large, consistent with an ideal AC path to ground and the capacitance of said filter capacitor means being very small, consistent with a limited AC path to ground but large enough to pass sufficient current to keep the worse case fault currents well below any shock hazards and to allow sufficient current flow to trip relevant circuit breakers in the event of a short circuit.

It is an object of this invention to provide an arrangement in accord with the preceding object in combination with converter means in which high frequency AC is generated as an intermediate process in the flow of energy and in which special capacitor means is provided for absorbing voltage spikes of said high frequency AC.

It is a feature of the invention is to provide the combination of an electrical distribution box housing a neutral buss, a power buss, a ground buss and a DC isolation capacitor, the DC isolation capacitor being of sufficient capacitance and little bulk, so as to provide an AC path through the neutral conducting circuit and be DC blocking.

DETAILED DESCRIPTION OF THE INVENTION

Figure 1:
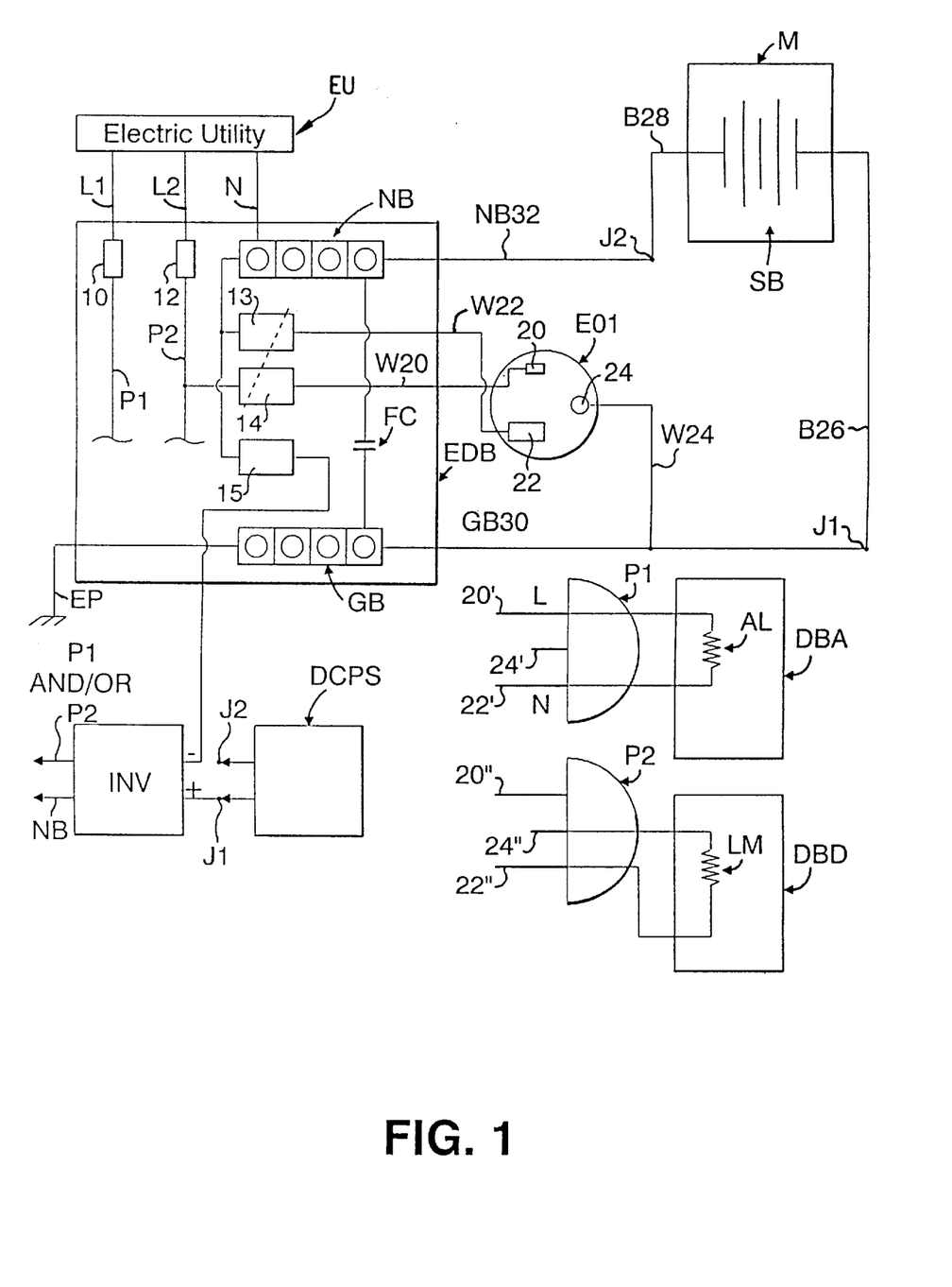
FIG. 1 illustrates the dual voltage concept of the invention, the ganged circuit breaker means concept and the modular concept thereof.

FIG. 1

Reference is had at this time to FIG. 1 which shows a partial circuit diagram of this invention, illustrating a conventional three-wire or split-phase system comprised of the electric utility power line wires L1 and L2 and the neutral wire N as may be supplied from an electric utility EU and extending into the electrical distribution box EDB of an abode, dwelling or the like (which may be mobile or not), which box is shown in rather simplified form. Suffice it to say that the box EDB is provided with conventional knock-out openings through which the cables or wires from the utility or to and from other entities are passed, the wires L1 and L2 being connected to the power company or electric utility circuit breakers 10 and 12 whereby the internal power busses P1 and P2 and the dwelling circuits AL in the AC distribution box DBA and the dwelling circuit intrinsic load means LM in the DC distribution box DBD to which they are connected are protected from excessive voltages or surges emanating from the utility EU. The neutral wire N is connected internally to the neutral buss NB which is isolated from direct connection to the internal ground buss GB of the distribution box EDB.

A conventional electrical connection element, such as outlet EO1, which may be, for example, a receptacle or a cable, is shown whose electrical plug openings 20, 22 and 24 are shown to be connected by wires W20, W22 and W24 passing through suitable knock-out openings in the box EDB and into connection with a current responsive circuit interrupter, such as the circuit breaker 14, as well as with the neutral buss NB and the ground buss GB, respectively. It will be appreciated that the circuit breakers 10 and 12 referenced above are of conventional type in that they snap into place when the conventional hinged front panel of the box EDB is swung aside to expose any circuit breakers housed within the box. This is much preferred to the older screw-threaded fuse receptacles. At any rate, the modular feature of this invention involves the use of the storage battery means SB having its positive terminal connected by the wiring B26 having a junction J1 with the ground buss wiring GB30 which passes into the box EDB into connection with the ground buss GB as illustrated. The negative terminal of the storage battery means SB is connected by the wiring B28 whose junction J2 with the neutral buss wiring NB32 connects internally of the box EDB to the neutral buss NB as shown.

Since the wire connections W20, W22 and W24 are as shown, the prongs 20', 22' and 24' of the electric plug P1 may be used to feed the AC loads AL powered by the box DBA. Similarly, The electric plug P2 may be used to feed the intrinsic DC load means LM powered by the box DBD.

FIG. 1 illustrates a basic modular unit M which is external to the box EDB and therefore attains some surprising advantages which will now be explained. The basic modular unit M comprises the rechargeable storage battery means SB which represents the battery storage capacity to be drawn upon when DC power is not otherwise available to the consuming load. The storage battery means SB is chargeable in deep cycle fashion to a charge value at which an incipient electrolyte boiling point is reached and the battery charging means employed must be capable of effecting such charge value as will ensure this level of charge without either overcharging or undercharging.

An important aspect of this invention resides in the compound use of the "battery equivalent capacitance", inherent with the storage battery means SB, in conjunction with the filter capacitor FC. The magnitude of the "battery equivalent capacitance" gain per unit volume exhibited by the storage battery means SB is outstanding. To illustrate this point, a standard filter capacitor FC might have a capacitance measured in microfarads and be of a bulk or volume to fit easily within the box DB. The storage battery means will have a battery equivalent capacitance of at least 10,000 Farads. The high battery equivalent capacitance of the storage battery means is highly effective for AC ripple filtering but the bulk is too high for incorporation within the box EDB and, more importantly, it provides an ideal AC path to ground. If the storage battery means SB were to be removed, even temporarily, the limited AC path to ground supplied by the filter capacitor FC would be inadequate. By substituting a 12 volt deep cycle lead-acid battery means SB of say, 1 cubic foot volume, the relative "battery equivalent capacitance" would be at least 10,000 Farads. Stated otherwise, such storage battery means SB would provide a very large and adequate AC path to ground commensurate with the load current being drawn and the limited AC path to ground afforded by the filter capacitor FC would still be essential to comply with local electrical codes. The two capacitors operate in conjunction with one another and both are essential for complying with local codes, the means SB conducting current in opposite directions consistent with the requirements for AC conduction to ground and its associated DC power supply additionally providing a DC isolation path from ground, and the means FC providing a second, but limited, AC path to ground in the event that the means SB becomes disabled. In regard to the latter, the means FC is sized in capacitance wherein the capacitive reactance Xc is low enough to pass sufficient current to keep both the worst case fault currents well below any shock hazards and to allow sufficient current flow to trip the relevant circuit breaker(s) in the event of an appliance short circuit.

It will be appreciated that although the filter capacitor FC normally would be hard wired within the box EDB, it could be incorporated within the module M in parallel with the storage battery means.

As will be seen, AC potential is available at the wirings W20 and W22 because the power buss P2 is supplied with AC power and DC potential is available at the wirings W22 and W24 because of the presence of the storage battery means SB. Therefore, the plug openings 20 and 22 may be connected to the AC load means AL of the distribution box DBA through the prongs 20' and 22' of the electric plug P1 and the plug openings 22 and 24 may be connected to the intrinsic DC load means LM of the electric distribution box DBD through the prongs 22" and 24" of the electric plug P2.

As noted before, the illustration of FIG. 1 is somewhat simplified because only one AC power buss P2 is connected although other and different connections could be illustrated and only one DC power availability is illustrated between the wirings W22 and W24 although the electrical outlet EO0 could be much more complex and offer a great deal more in the way of AC and DC power capabilities. Such will be illustrated in greater detail hereinafter.

Figure 2:
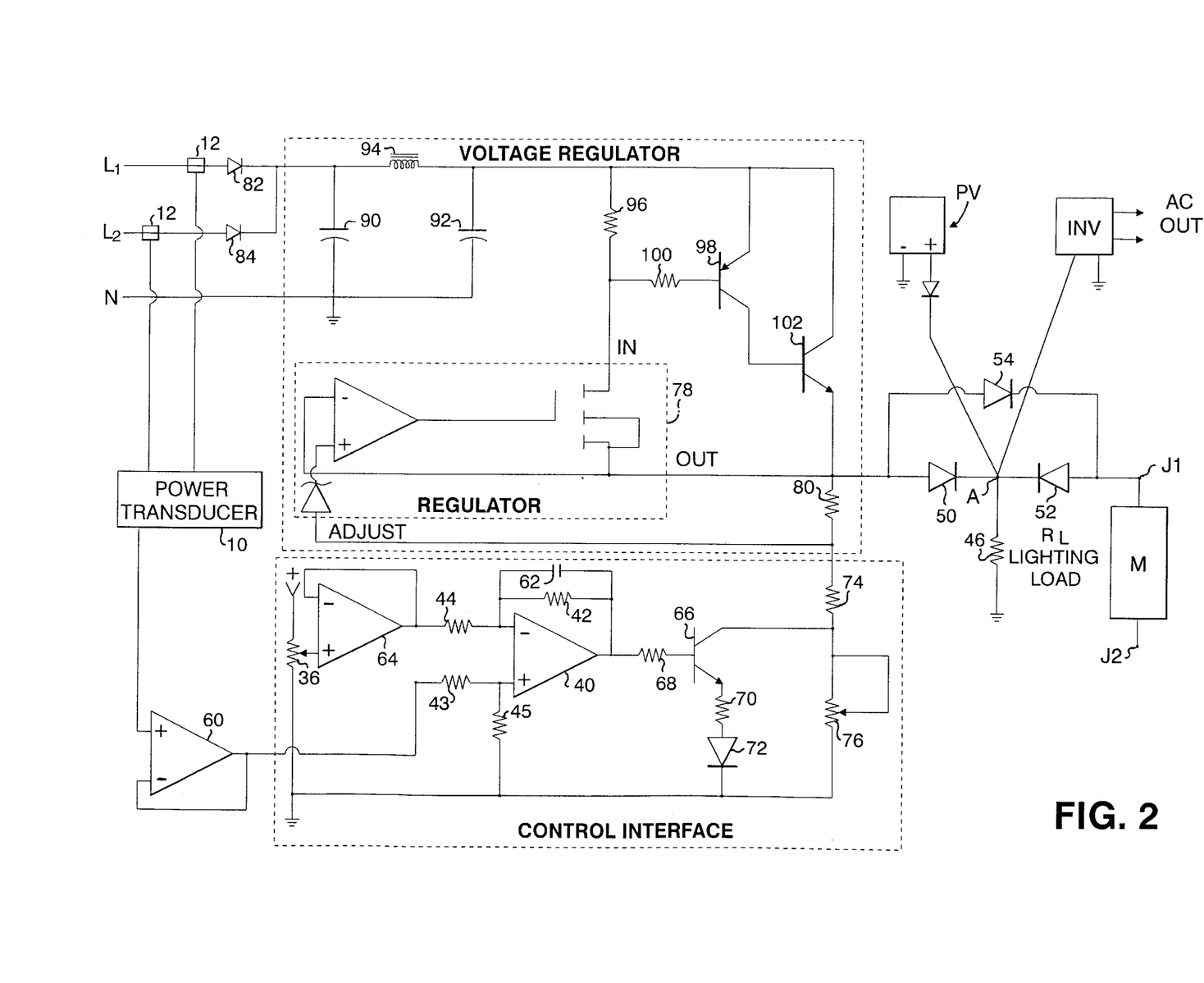
FIG. 2 illustrates the invention with regard to incorporation of the linear voltage regulator and control interface of my U.S. Pat. No. 5,500,561 as one means for controlling the charge level of the storage battery means.

FIG. 2

Figure 3:
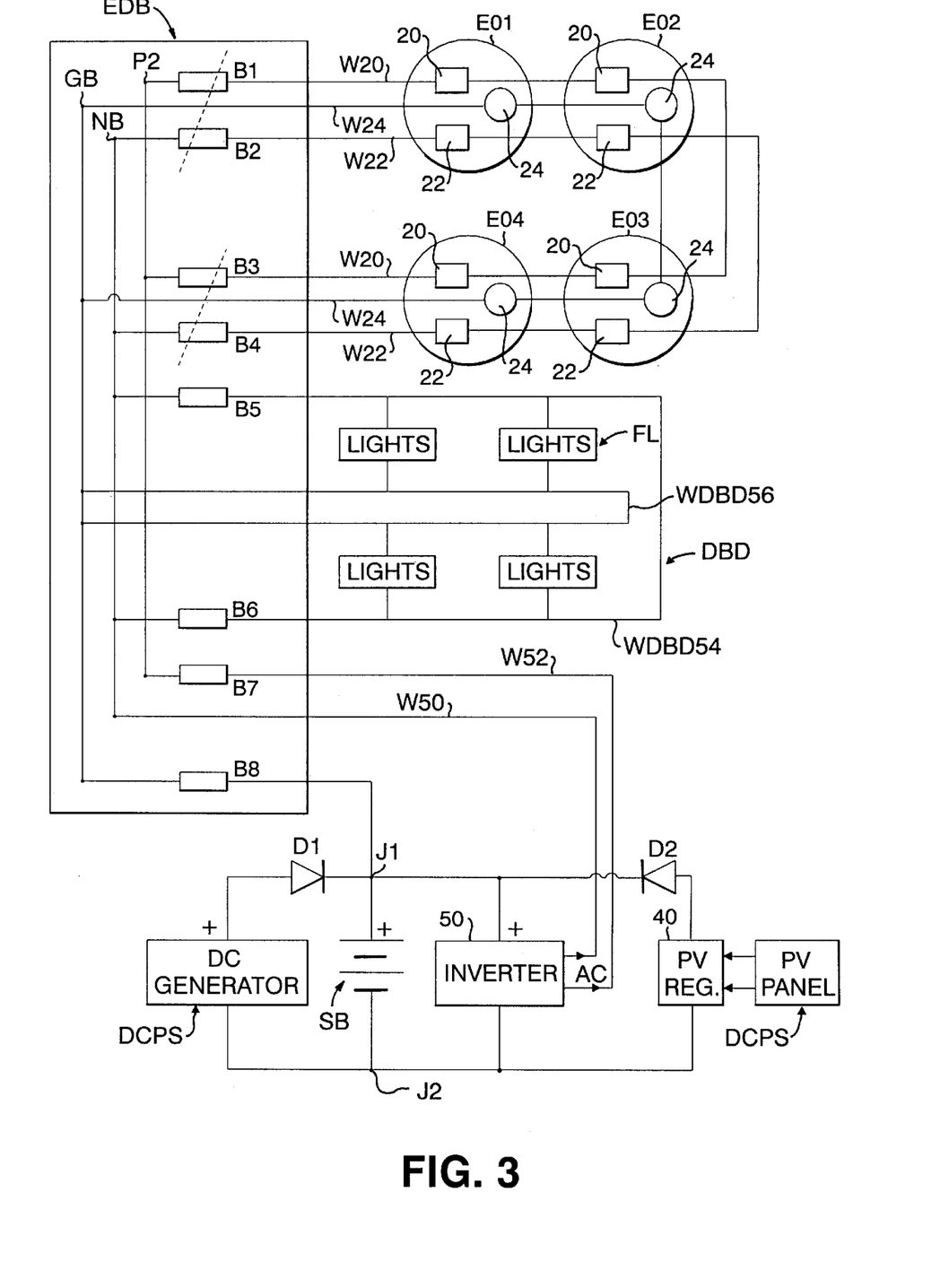
FIG. 3 illustrates the use of a current responsive circuit interrupter, such as a circuit breaker means, and the looping of a DC lighting circuit as well as auxiliary DC equipment and an inverter associated with a simplified illustration of the electric distribution box.

With reference to FIG. 2, note that the circuit shown largely parallels FIG. 3 of my U.S. Pat No. 5,500,561 wherein the rectification effected by the diodes 82 and 84 feed the TEE circuit 94, 90, 92 of the voltage regulator section (so labeled) operating in conjunction with the control interface (so labeled) to output DC at the junction A. It is to be noted that the circuit thus far described does not meet the definition of a converter as defined in this application because AC is not generated as an intermediate process in the flow of energy. Thus, the inefficiency inherent with conversion is not present and an important objective of this invention is realized, namely, that in maintaining the charge level of the storage battery means SB to service an intrinsic DC load means such as 46 in FIG. 2 or the electronically (DC) ballasted fluorescent lighting circuit FL in FIG. 3, is maintained at the desired level. Note the three modes of operation disclosed in my U.S. Pat. No. 5,500,561.

When AC input is present, the voltage regulator function illustrated in FIG. 2 is an excellent means for maintaining the charge level of the storage battery means SB, contained within the module M and which is connected to the junctions J1 and J2 (see FIG. 1). The lighting load 46 is, of course, an intrinsic DC load means such as the looped LIGHTS circuits looped between the ground buss GB and the circuit breakers B5 and B6 which are connected to the neutral buss NB as in FIG. 3. The DC power source DCPS of FIG. 1 is the photovoltaic panel means PV of FIG. 2 and the inverter means INV is shown in both Figures. It will also be understood that although the electric distribution box EDB is not illustrated fully in FIG. 2, this is done for simplicity to avoid overcrowding of the Figure.

FIG. 3

FIG. 3 shows the electric distribution box EDB in simplified and uncluttered form and is principally directed to illustrating the concept of ganged circuit breakers and of looping of an intrinsic DC load means as well the use of a load source means. The box EDB is outlined and the ground buss GB, the neutral buss NB and the power buss P2 are all designated. The DC ballasted fluorescent lighting intrinsic DC load means FL comprises an example of a distributor box DBD emanating from the box EDB. The looping is between the neutral buss NB (−DC) through the circuit breaker means B5 and B6 to the ground buss GB (+DC). Four electrical outlet means E01, E02, E03 and E04 are illustrated, all identical, with the two wirings W20 connected with the power buss P2 through the respective circuit breaker means B1 and B3. Similarly, the two wirings W22 are connected with the neutral buss NB through the respective circuit breaker means B2 and B4. The two circuit breakers B1 and B3 each correspond to the circuit breaker 14 in FIG. 1 whereas the two circuit breakers B2 and B4 each correspond to the circuit breaker 13 in FIG. 1. The circuit breakers B1 and B2 "belong" to an AC path and a DC path, respectively, and the circuit breakers B3 and B4 similarly "belong".

Electric plugs P1 and/or P2 may be plugged in to the electric outlets with their prongs 20', 22', 24' and/or 20", 22", 24" as previously described.

The DC power sources DCPS are illustrated as the DC generator and the photo-voltaic panel means PV which, after regulation at the regulator 40, passes through the isolating diode D2 to the junction A to which the positive side of the DC generator DCPS is connected through the isolating diode D1. The junction A is connected to the ground buss GB through the circuit breaker B8 whereas the AC input from the inverter 50 is connected to the neutral buss NB by means of the wiring W50 and to the circuit breaker B7 through the wiring W52. The looping of the intrinsic DC load means effectively doubles the current carrying capacities of the associated wirings whereas the ganging of the AC and DC paths as to circuit breaker means allows the dual voltage aspect to be carried out with increased safety.

To reiterate some of the above, the modular concept of this invention is very important in that it involves the provision of separate entities which are the storage battery means SB and the filter capacitor means FC. The storage battery means SB has a very large battery equivalent capacitance consistent with an excellent AC path to ground and the filter capacitor means FC has a very small capacitance consistent with a limited AC path to ground and being sized in capacitance wherein the capacitive reactance Xc is low enough to pass sufficient current to keep both the worst case fault currents well below any shock hazards and to allow sufficient current flow to trip the relevant circuit breaker(s) in the event of an appliance short circuit.

Figure 4:
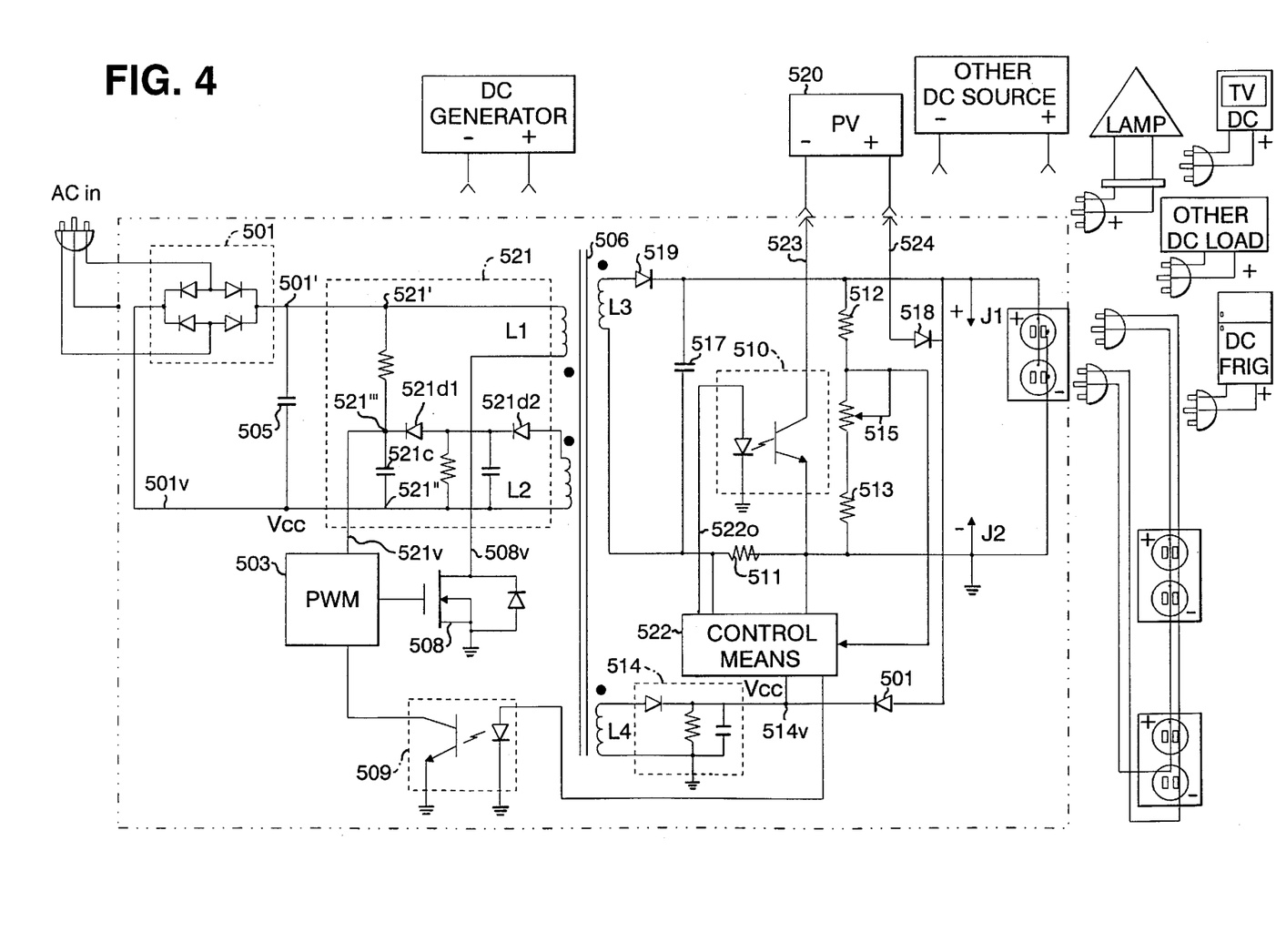
FIG. 4 illustrates a converter fed by the DC supply from a rectifier and providing an output to storage battery means illustrated as having a filter capacitor in electrical parallel therewith; and, FIG. 5 illustrates the dual voltage concept of the invention, the ganged circuit breaker means concept, the means for avoiding undesirable DC current paths and the modular concept thereof.

FIG. 4

FIG. 4 is directed to a circuit, which embodies a switching type converter of very high efficiency and is a preferred form of converter because this type of DC-to-DC power supply represents high efficiency contemporaneously possible. FIG. 4 illustrates input mechanisms, some of which are not designated by reference characters but which are designated as to function, and also illustrates output mechanisms, none of which are designated by reference characters but which hare designated as to function. In all such cases, the meanings should be clear and the additional descriptive material detailing the mechanisms and reference characters are believed to be unnecessary.

The block enclosed in dashed lines and designated by the reference character 501 is a typical full wave rectifier bridge circuit (i.e. the opposite of an inverter) feeding the capacitor 505 at the junction 501' and whose purpose is to reduce the rectified ripple component of the circuit 501 and provide filtered DC input voltage, present between the junction 501' and the conductor 501$v$, to the converter means.

The converter circuit shown, downstream of and as fed by filtered DC from the rectifier circuit 501, has junctions 521' and 521' within the section 521 between which the resistor/capacitor pair 521$r$ and 521$c$ are connected and which pair provide the further junction 521'". The junction 521'" is connected to the conductor 521$v$ which supplies the pulse width modulator 503 with positive voltage Vcc, and this junction feeds the diode 521$d$1 having junctions with the parallel resistor/capacitor pair which are connected between the diode 521$d$2 and the junction 521".

The converter employs a pulse width modulator PWM, indicated at 503, controlling the switching transistor circuit 508 to impress transient voltage spikes present on the conductor 508$v$ through the primary of the transformer 506 to cycle current to the primary windings L1 and L2 of the transformer 506 whereby "ac is generated as an intermediate process in the flow of energy" as is defined in the above definition of "converter". The secondary side of the transformer 506 is represented by the windings L3 and L4.

The circuit 509 is an optical isolation link between the pulse width modulator 503 and the control means 522 on the secondary side of the transformer 506 which allows control voltage on the conductor 509$v$ emanating from the pulse width modulator 503 on the primary side of the transformer 506 to provide an input to the control means 522 on the secondary side to influence the pulse width modulator PWM 503 without current leakage back from the secondary circuit. Typically, the frequency of conversion effected by the transformer 506 will be 20,000–100,000 Hz which dictates the need for the special capacitor 517 to absorb these transients, the capacitance of the capacitor 517 being typically about 1 microfarad when used.

A secondary winding L4 drives the circuit 514 which, similarly to the rectifier 501 plus the filtering of the capacitor 505, provides a DC output, in this case the proper DC input to the control means 522 at the conductor 514$v$. The control means 522 has an output conductor 522$o$ connected to the optical link 510 for controlling the three modes of operation of voltage control in accord with the principles of my prior applications. That is to say, when the optical isolator 510 link is "on", modes which permit DC current to flow from the photovoltaic means 520 are operative, i.e., either or both DC power input from the means 520 alone and partial or shared DC power input from the means 520. When the optical isolator 510 link is "off", the remaining mode, DC power input solely from another source, (i.e., no photovoltaic input) is effected.

The modes are controlled by the DC voltage prevailing across the junctions J1 and J2 (or the presence of a rechargeable DC mechanism such as a storage battery means connected to these junctions) in which case, mode 1. DC power input to the rechargeable DC mechanism alone, mode 2, shared DC power input, and mode 3 no DC power input to the rechargeable DC mechanism are the order of the day. That is to say, when the conductors 523 and 524 are connected to one of the DC sources illustrated in FIG. 4 or to a DC power source such as DCPS in FIG. 1 or in FIG. 3, the system will be fully operative for the purposes intended.

Stated another way, the DC voltage applied to the storage means will depend upon the feed back influenced by the resistors 36, 42, 43, 44, 45, 68, 70, 74 and 76 in FIG. 2 or by the resistors, including 511, 512, 513 and 515 in FIG. 4.

This is true even if the system according to this invention is operated on the barest of input. For example, in locations where either AC or DC power is available only part of the time, or is available on site only from mechanism thereat, some configuration disclosed in the drawing Figures herein will be effective to provide DC power supply to the storage battery means.

Figure 5:
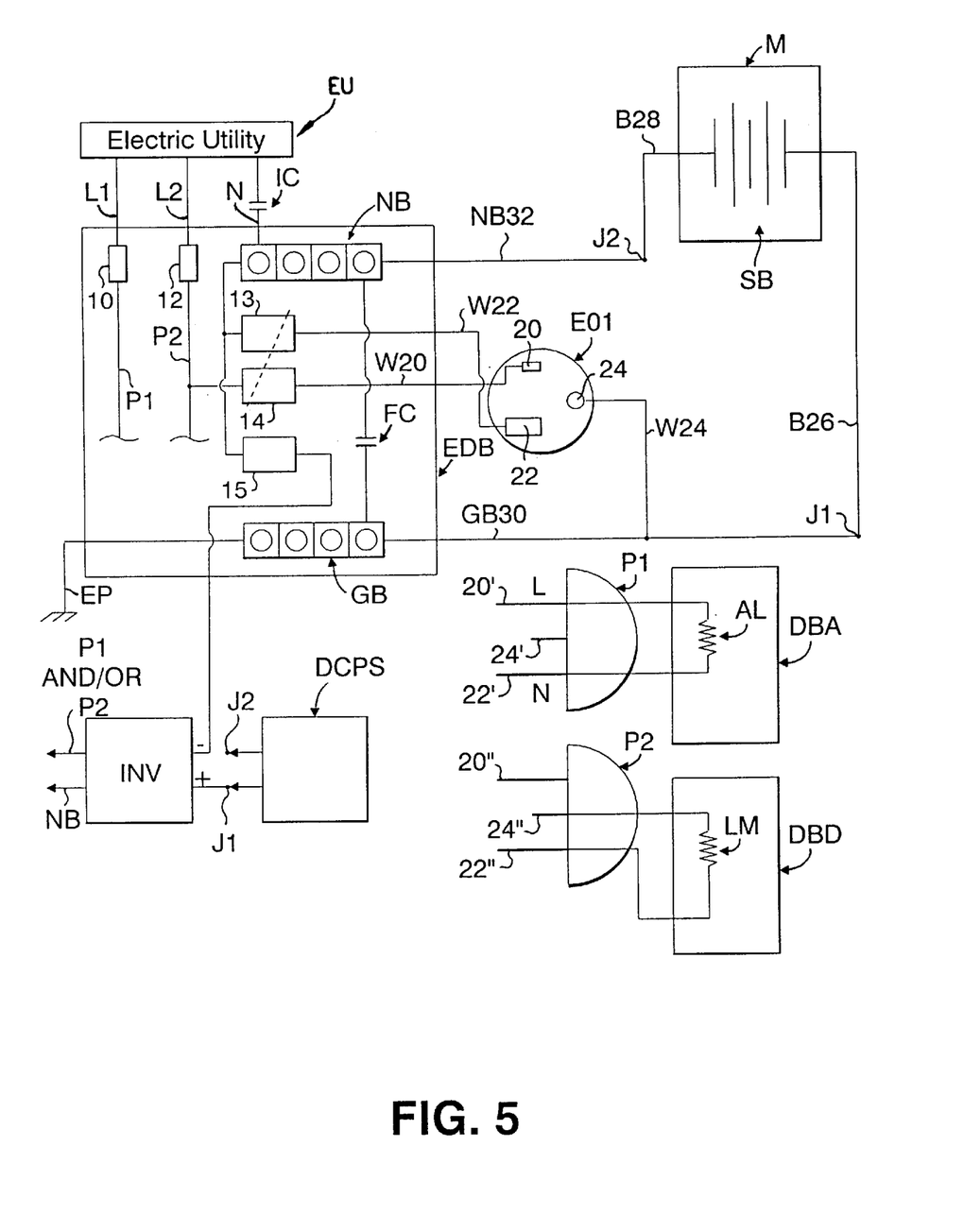

FIG. 5

FIG. 5 is substantially the same as FIG. 1, illustrating a conventional three-wire or split-phase system comprised of the electric utility power line wires L1 and L2 and the neutral wire N as may be supplied from an electric utility or an alternative AC power source, such as a generator set. FIG. 5 differs from FIG. 1 by the inclusion of DC isolation capacitor IC connected to one of the busses, such as, for example, being connected in series with the neutral circuit, as a means for avoiding undesirable DC current paths as may be encountered due to a multitude of established neutral-line connections to earthing grounds established throughout in AC power supply network. DC isolation capacitor IC is of sufficient capacitance to allow the low loss passage of unbalanced AC if the loads connected to the distribution system produce unequal currents in L1 and L2.

It is further noted that other modifications may be made to the present invention, without departing from the scope of the invention, as noted in the appended claims. For example, such modifications may optionally include DC blocking in other circuits that may have undesirable DC current paths to ground. Optionally, the DC isolation capacitor maybe connected with at least one common current path sharing AC and DC, such as wiring or a buss.

What is claimed is:

1. A modular power management system having common wiring for allowing both AC and DC power therethrough, said system capable of avoiding undesirable DC current paths as may be encountered due to a multitude of established neutral-line connections to earthing grounds established throughout in an AC power supply network, said system comprising:

an electrical distribution panel, capable of receiving both AC and DC power simultaneously;

a system of busses housed within the panel and including an electrical power buss, a neutral buss and a ground buss;

a module unit including a source of DC power connected across said neutral buss and said ground buss within said panel;

a connection for delivering AC power to said power, neutral and ground busses within said panel;

an electric outlet having at least one connection element, connected to said AC power buss, a second connection element connected to said neutral buss, and a third connection element connected to said ground buss;

a connector for selectively withdrawing AC or DC power for an external load constructed to engage with said electrical outlet so as to connect said load to selected connection elements within said electric outlet;

a current responsive circuit interrupter protecting said external load, including at least one circuit interrupter ganged for simultaneous tripping of both AC and DC power to said connection elements connected to said neutral and AC power busses; and a DC isolation capacitor being connected, so as to provide DC blocking, with at least one common current path sharing AC and DC, said isolation capacitor having a sufficient capacitance to allow low loss passage of AC power.

2. The modular power management system as in claim 1 wherein said at least one common current path is one of said busses.

3. The modular power management system as in claim 1 wherein said common current path is said neutral buss and said DC isolation capacitor is connected in series with said neutral buss.

4. The modular power management system as in claim 1 wherein said isolation capacitor allows low loss passage of unbalanced AC power if loads connected to said distribution system produce unequal currents in said common wiring.

5. The modular power management system as in claim 1 wherein said connection element is a receptacle.

6. The modular power management system as in claim 1 wherein said connection element is a cable.

7. The modular power management system as in claim 1 wherein said current responsive circuit interrupter is a circuit breaker.

8. In a modular power management system as defined in claim 1 wherein said DC power source includes a storage battery.

9. In a modular power management system as defined in claim 1, wherein said DC power source further comprises a voltage regulator for maintaining said DC power source within a desired voltage range.

10. In a modular power management system as defined in claim 1, wherein said DC power source is an AC to DC converter.

11. A method of electrical distribution at a site having both AC and DC power capability and a storage battery, said method capable of avoiding undesirable DC current paths as may be encountered due to a multitude of established neutral-line connections to earthing grounds established throughout in an AC power supply network, which comprises the steps of:

providing a common wiring system within said site having electrical lines sharing AC power and DC power passing therethrough;

supplying said storage battery with DC power for maintaining the voltage level of said storage battery not greater than fully charged as defined by the float potential of said storage battery;

providing a current responsive circuit interrupter in said site ganged for simultaneous tripping of both AC power and DC power;

delivering one of AC power and DC power simultaneously through said common wiring at said site;

selectively withdrawing one of AC power and DC power for at least one external load at said site; and, a DC isolation capacitor being connected, so as to provide DC blocking with at least one common current path sharing AC and DC power, said isolation capacitor having sufficient capacitance to allow low loss passage of AC power.

12. The modular power management system as in claim 11 wherein said at least one common current path is a buss.

13. The modular power management system as in claim 12 wherein said buss is a neutral buss and said DC isolation capacitor is connected in series with said neutral buss.

14. The modular power management system as in claim 11 wherein said isolation capacitor allows low loss passage of unbalanced AC power if loads connected to said distribution system produce unequal currents in said common wiring.

15. The modular power management system as in claim 11 wherein said current responsive circuit interrupter is a circuit breaker.

16. The method of electrical distribution at a site as defined in claim 11, further including the step of providing a filter capacitor in electrical parallel with said storage battery, utilizing a storage battery having an equivalent capacitance which is very large, consistent with an ideal AC path to ground and the capacitance of a filter capacitor is very small consistent with a limited AC path to ground but large enough to pass sufficient current to keep fault currents as determined by the ratings of said current responsive circuit interrupter from constituting a shock hazard and to allow sufficient current flow to trip relevant current responsive circuit interrupters during a short circuit, and passing current therethrough.

17. In a power management system, said system capable of avoiding undesirable DC current paths as may be encountered due to a multitude of established neutral-line connections to earthing grounds established throughout in an AC power supply network, said system comprising the combination of a storage battery and a filter capacitor, said system providing both an AC conduction path to ground and a DC isolation from ground, said combination carrying AC power while isolating DC current, and a controller for controlling a charge level of said storage battery, said filter capacitor providing a capacitance value to carry AC current at 60 Hz and to insure a low impedance path to ground at 60 Hz and said storage battery having a capacitance value such as to insure conduction to ground in either direction of current flow therethrough, and a DC isolation capacitor being connected, so as to provide DC blocking, with at least one common current path sharing AC and DC, said isolation capacitor having a sufficient capacitance to allow low loss passage of AC power.

18. The modular power management system as in claim 17 wherein said at least one common current path is a buss.

19. The modular power management system as in claim 18 wherein said buss is a neutral buss and said DC isolation capacitor is connected in series with said neutral buss.

20. The modular power management system as in claim 17 wherein said isolation capacitor allows low loss passage of unbalanced AC power if loads connected to said distribution system produce unequal currents in said system.

21. In a power management system as defined in claim 17, wherein said controller controlling said charge level of said storage battery is a voltage regulator with a rectifier providing DC input to said voltage regulator.

22. In a power management system as defined in claim 17, wherein said controller for controlling said charge level of said storage battery is a converter with a rectifier providing DC input to said converter.

23. A power management system comprising the combination of an electrical distribution box and a modular unit, said system capable of avoiding undesirable DC current paths as may be encountered due to a multitude of established neutral-line connections to earthing grounds established throughout in an AC power supply network, said electrical distribution box containing a common wiring system carrying therethrough, separately or simultaneously, both AC power and DC power therethrough, said box also housing a power buss, a neutral buss, a ground buss and an AC bypass filter capacitor of relatively small capacitance and bulk connected between said neutral buss and said ground buss;

said modular unit housing a storage battery providing a battery equivalent capacitance and bulk which is substantially greater than the capacitance and bulk of said AC bypass filter capacitor, said storage battery being housed within said modular unit and connected across said neutral buss and said ground buss and a DC isolation capacitor being connected, so as to provide DC blocking, with at least one common current path sharing AC and DC, said isolation capacitor having a sufficient capacitance to allow low loss passage of AC power.

24. The combination as in claim 23 wherein said at least one common current path sharing AC and DC is one of said busses.

25. The combination as in claim 24 wherein said buss is said neutral buss and said DC isolation capacitor is connected in series with said neutral buss.

26. The combination as in claim 23 wherein said isolation capacitor allows low loss passage of unbalanced AC power if loads connected to said distribution system produce unequal currents in said common wiring.

27. The combination as in claim 23 wherein said storage battery is housed within said modular unit.

28. The combination as in claim 23 wherein said storage battery is housed outside of said modular unit.

29. The combination as defined in claim 23, including a DC power supply for supplying said storage battery with DC energy, and a DC load connected between said ground buss and said neutral buss for supply by said storage battery and said power supply.

30. The combination as defined in claim 29, including a current responsive circuit interrupter.

31. The combination as in claim 30 wherein said current responsive interrupter is a ganged circuit breaker ganged for simultaneous tripping of both high and low sides of AC voltage and DC power.

32. The combination as defined in claim 30, wherein said DC power supply includes a device selected from the group consisting of fuel sourced, engine driven electrical power generators, photovoltaic cells, fuel cells, wind powered DC sources and hydro-electric DC sources as well as other sources capable of meeting the requirements of a DC power supply.

33. The combination as defined in claim 23 including a voltage regulator for maintaining a charge level on said storage battery and a rectifier for providing DC input to said regulator.

34. The combination as defined in claim 33 including a current responsive circuit interrupter.

35. The combination as defined in claim 34 wherein said current responsive circuit interrupter is a ganged circuit breaker ganged for simultaneous tripping at both AC power and DC power.

36. The combination as defined in claim 34 wherein said DC power supply includes a device selected from the group consisting of fuel sourced engine driven electrical power generators, photovoltaic cells, fuel cells, wind powered DC sources, hydro-electric DC sources and energy converters that produce DC power.

37. The combination as defined in claim 23 including a converter for maintaining a charge level on said storage battery and a rectifier for providing DC input to said converter.

38. The combination as defined in claim 37 including a current responsive circuit interrupter.

39. The combination as defined in claim 38 wherein said current responsive circuit interrupter is a ganged circuit breaker ganged for simultaneous tripping.

40. The combination as defined in claim 38 wherein said DC power supply includes a device selected from the group consisting of fuel sourced, engine driven electrical power generators, photo-voltaic cells, fuel cells, wind powered DC sources, hydro-electric DC sources and energy converters that produce DC power.

41. The combination as in claim 33 wherein buss is a neutral buss and said DC isolation capacitor is connected in series with said neutral buss.

42. In a power management system, the combination of a DC power supply and a filter capacitor providing both an AC conduction path to ground and DC isolation from ground, said system capable of avoiding undesirable DC current paths as may be encountered due to a multitude of established neutral-line connections to earthing grounds established throughout in an AC power supply network, said combination of said DC power supply and said filter capacitor carrying AC power while isolating DC current, a common wiring system providing both AC power and DC power therethrough, said common wiring system carrying said AC and DC power separately or simultaneously and a controller controlling a voltage level of said DC power supply, said filter capacitor having a capacitance such as to insure a low impedance path to ground at 60 Hz and said DC power supply having a capacitance value such as to insure conduction to ground in either direction of current flow therethrough, said filter capacitor being effective to maintain said AC conduction path to ground if a storage battery is not utilized within the system, and a DC isolation capacitor being connected, so as to provide DC blocking, with at least one common current path sharing AC and DC, said isolation capacitor having a sufficient capacitance to allow low loss passage of AC power.

43. The combination as in claim 42 wherein said at least one common current path sharing AC and DC is a buss.

44. The combination as in claim 41 wherein said isolation capacitor allows low loss passage of unbalanced AC power if loads connected to said distribution system produce unequal currents in said system.

45. In a power management system as defined in claim 41 wherein said controller for controlling said voltage level comprises a further DC power source.

46. In a power management system as defined in claim 45 wherein said controller for controlling said voltage level includes a voltage regulator.

47. In a power management system as defined in claim 45 wherein said controller for controlling said voltage level includes a converter in which high frequency AC is generated as an intermediate process in the flow of energy.

48. In a power management system as defined in claim 47 including a special filter capacitor for absorbing voltage spikes of said high frequency AC.

* * * * *